United States Patent
Gleason

[15] 3,688,218
[45] Aug. 29, 1972

[54] STIMULATED RADIATION CAVITY REFLECTOR

[72] Inventor: Thomas J. Gleason, Silver Spring, Md.

[73] Assignee: The United States of America as represented by the Secretary of the Army

[22] Filed: Jan. 29, 1971

[21] Appl. No.: 110,844

[52] U.S. Cl. .................331/94.5, 350/202, 350/293, 250/296
[51] Int. Cl...............................................H01s 3/08
[58] Field of Search .....331/94.5; 350/293, 296, 202; 356/106, 112

[56] References Cited

UNITED STATES PATENTS

| | | | |
|---|---|---|---|
| 3,388,343 | 6/1968 | White | 331/94.5 |
| 3,478,277 | 11/1969 | Giordmaine et al. | 331/94.5 |
| 3,487,331 | 12/1969 | Gates | 331/94.5 |
| 3,515,464 | 6/1970 | Peifer et al. | 331/94.5 |
| 3,524,146 | 8/1970 | Mohn | 331/94.5 |
| 3,539,262 | 9/1970 | Witteman | 331/94.5 |
| 3,537,028 | 10/1970 | Pankove | 331/94.5 |

FOREIGN PATENTS OR APPLICATIONS 983,342  2/1965  Great Britain.............350/202

*Primary Examiner*—William L. Sikes
*Attorney*—Harry M. Saragovitz, Edward J. Kelly and Herbert Berl

[57] ABSTRACT

A stimulated radiation cavity reflector for achieving large mode diameters in a short resonant cavity with low output beam divergence and high stability. The reflector in its simplest form comprises a plano-concave substrate whose plane surface has a reflective coating deposited thereon and whose concave surface has an anti-reflective coating. The effects resulting from the use of such a back-surface positive mirror in a laser cavity is shown to be similar to the effects resulting from the use of a front-surface plano-convex negative mirror in the same cavity. The relationship of the radii of curvature of an equivalent back-surface positive mirror to a given negative mirror is described herein.

5 Claims, 3 Drawing Figures

Patented Aug. 29, 1972

3,688,218

INVENTOR,
THOMAS J. GLEASON

BY Harry M. Saragovitz
Edward J. Kelly
Herbert Berl
ATTORNEYS

STIMULATED RADIATION CAVITY REFLECTOR

RIGHTS OF GOVERNMENT

The invention described herein may be manufactured, used, and licensed by or for the United States Government for governmental purposes without the payment to me of any royalty thereon.

BACKGROUND OF THE INVENTION

1. Field of the Invention

This invention relates to optical reflectors, and more particularly, to a novel reflector for use in a stimulated radiation cavity such as a maser or laser.

2. Description of the Prior Art

In the utilization of portable laser devices, it is desirable to have short, compact cavities with large eigenmode diameters and low beam divergence. These two requirements compete with each other when only positive or infinite mirrors are used (a positive mirror is concave as seen from inside the cavity and an infinite mirror is flat). However, a combination of a positive and a negative mirror (convex as seen from inside the cavity) can simulate a long cavity in a short space and achieve the low beam divergence and large eigenmode diameters of the long cavity. See, for example, the paper presented at the 1970 International Electron Devices Meeting entitled "Compensation For Thermally Induced Birefringence in Nd-YAG Lasers" by deWitt and Scott. However, large radius negative laser reflectors are not stock items, and thus are expensive in that they must be custom made for each particular application. Additionally, in order to provide minimum output beam divergence in a laser cavity that has a positive and a negative mirror, one mirror or the other must be figured on both sides so that the beam is collimated by the lensing action of the output mirror. Thus, while the attributes of a negative mirror system are desirable, they are in most cases overcome by their unavailability and/or high cost of manufacture. Furthermore, all front-surface mirrors have the disadvantage that when they are cleaned, there is a high likelihood of damage to the critical layers of the exposed dielectric coating.

It is therefore a primary object of the present invention to provide a stimulated radiation cavity reflector that provides all the advantages of a negative mirror without the requirement for a negative mirror substrate.

Another object is to provide an optical reflector for use in a laser cavity that permits the construction of a short, compact cavity with low beam divergence and high stability.

Another object of the present invention is to provide a stimulated radiation cavity reflector that is highly durable, inexpensive to manufacture, and whose substrate is readily available as a stock item.

Another object is to provide an optical reflector for use in a laser cavity that provides large eigenmode diameters in short resonant cavities resulting in the most efficient use of the excited volume of the active medium.

SUMMARY OF THE INVENTION

Briefly, in accordance with the invention, a stimulated radiation cavity reflector is provided that permits the construction of short, compact and highly efficient cavities that have a low output beam divergence. The reflector comprises a plano-concave substrate that is located at one end of the cavity with its concave side facing into the cavity and has a reflective coating on its plane side for reflecting the stimulated radiation back through the cavity. The effect of the back-surface coated plano-concave substrate in the cavity is the same as having a front-surface negative mirror in its place. The radius of curvature of an equivalent back-surface plano-concave mirror bears a definite relationship to a given front-surface negative mirror. The back-surface positive mirror has the output characteristics of a flat mirror so as to provide a collimated output beam from the system. If the plano-concave substrate is selectively absorbing, it can be used to suppress unwanted laser transitions while introducing only one additional surface into the cavity.

BRIEF DESCRIPTION OF THE DRAWINGS

The specific nature of the invention as well as other objects, aspects, uses and advantages thereof will clearly appear from the following description and from the accompanying drawing, in which.

DESCRIPTION OF THE PREFERRED EMBODIMENTS

Figure 1:
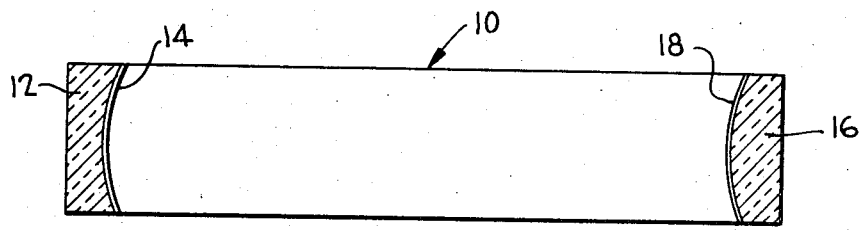
FIG. 1 is a sectional side view of a laser cavity representative of the prior art with respect to the device of the present invention.

FIG. 1 is illustrative of one prior art method utilized to obtain a highly efficient stimulated radiation cavity 10 that provides a low output beam divergence such as is desired in a portable field laser device. In order to provide the highest efficiency, it is desirable to have the diameter of the eigenmode beams to be properly matched to the diameter of the active medium. Other factors to be considered are the desirability of a low output beam divergence, and the use of spherical mirrors with reasonable radii of curvature for increased stability. One way of achieving these ends is illustrated in FIG. 1 which shows a positive spherical mirror 12 with a front-surface reflective coating 14 combined with a negative spherical mirror 16 that has a front-surface reflective coating 18, said mirrors being located at the opposite ends of laser cavity 10. The low output beam divergence requirement is attained since the combination of a positive and a negative mirror effectively simulates a long cavity in a short space, as referenced above. In general, the positive-negative cavity is desirable but cannot have a plane output mirror, since neither mirror is flat. Thus, for minimum output beam divergence, one mirror or the other must be figured on both sides so that the beam is collimated by the lensing action of the output mirror.

Figure 2:
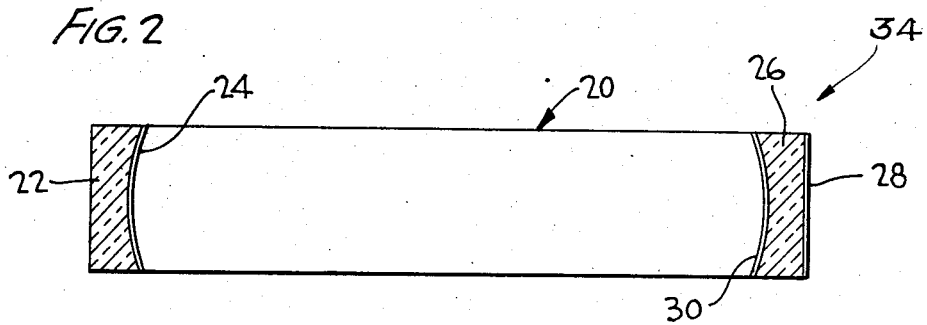
FIG. 2 is a sectional side view of a stimulated radiation cavity embodying the novel reflector of the present invention.
Figure 3:
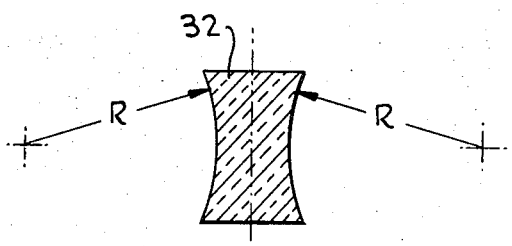
FIG. 3 is a side view of an optically equivalent lens of the device of the present invention.

The disadvantages inherent in the system of FIG. 1, as explained above under the Background of the Invention, are overcome by the use of the device of the present invention which is illustrated as an integral part of the laser cavity 20 of FIG. 2. The reflector 34 of the present invention comprises a positive plano-concave substrate 26 that has a reflective coating 28 located on its plane side and an anti-reflective coating 30 located on its concave side, to prevent spurious reflections therefrom, as seen in FIG. 2. At the other end of cavity 20 is located suitable reflecting means chosen to provide a stable cavity, such as, for example, a normal positive mirror 22 whose front surface is coated with a reflective coating 24. To better understand the affect of the back-surface mirror 34 of the present invention and the advantages attendant thereto, consider a beam passing into mirror 34, reflecting from the reflective coating 28 on its back surface, and passing back out through substrate 26 into cavity 20. The well-known equivalent optical system for the action just described is illustrated in FIG. 3 which shows a folded out lens 32 with a radius of curvature R equal to the radius of curvature of the concave side of substrate 26. The application of the well-known lens maker's equation to the lens of FIG. 3 yields the following result:

$$1/f = (n-1)(-1/R - 1/R) = (1-n)2/R \quad 1.$$

where $f$ is the focal length, $R$ represents the radii of curvature (being equal in the illustration), and $n$ is the index of refraction. For a front-surface mirror, such as the negative mirror 16 of FIG. 1, the effective round trip lens has a focal length $f$ given by the relationship:

$$1/f = 2/R' \quad 2.$$

where $R'$ is the radius of curvature, see Kogelnik and Li, Appl. Opt. 5, No. 10 (1966), p. 1550. To obtain a relationship between the radii of curvatures of a back-surface mirror and a front-surface mirror, equate the righthand terms of equations (1) and (2) to yield:

$$R' = R/(1-n) \quad 3.$$

Thus it is seen that the back-surface mirror 34 of the present invention having a radius of curvature $R$ is equivalent to a front-surface mirror of radius $R'$ where $R'$ is equal to $R$ divided by the quantity 1 minus the index of refraction of the back-surface mirror. In general, the index of refraction $n$ will be greater than one for all materials at visible and infrared wavelengths, such that the back-surface positive mirror 34 of the present invention is equivalent to a front-surface negative mirror and thus when utilized as depicted in FIG. 2 has all the desirable attributes of the positive-negative cavity of FIG. 1 without any of the attendant disadvantages of a front-surface coated negative mirror. That is, the device of the present invention can be readily prepared using plano-concave substrates which are less expensive and more readily available than plano-convex substrates. Additionally, since the laser resonant mode must have a phasefront curvature equal to the reflective surface curvature, the back-surface mirror 34 of the present invention has the output characteristics of a flat mirror, so that a collimated output beam is readily available therefrom. Furthermore, the mirror coating 28 is used from the inside of the substrate 26, where it is unlikely to be damaged when the mirror is cleaned.

While in the preferred embodiments I have presented a back-surface plano-concave mirror that is equivalent to a front-surface negative mirror, it is obvious that back-surface negative mirrors may be utilized to replace normal positive mirrors in a stable cavity configuration and that similar advantages will result therefrom, especially with respect to having an inner protected layer of dielectric and a plane mirror output combined with a curved mirror cavity. Additional advantages may accrue if the back-surface mirror substrate is selectively absorbing, whereby it can be used to suppress unwanted laser transitions while introducing only one additional surface into the cavity. An example would be the use of a boro-silicate glass substrate on a He-Ne laser to suppress the 3.39 micron line. This method would find particular use in integral mirror plasma tubes, where introducing a separate absorber would be difficult. If the front surface of the back-surface mirror is such as to give an unstable cavity when combined with the other reflector, a spike transmission coating on the front surface can be used to suppress all unwanted lines by preventing them from reaching the reflector on the back surface.

I wish it to be understood that I do not desire to be limited to the exact details of construction shown and described, for obvious modifications will occur to a person skilled in the art.

I claim as my invention:

1. Apparatus for stimulating the emission of radiation which comprises:
   a. a resonant cavity having a fixed length and containing an active medium;
   b. a plano-concave mirror located at a first end of said cavity for reflecting said stimulated radiation through said cavity; and
   c. means for expanding the eigenmode diameter within said cavity comprising a plano-concave substrate located at a second end of said cavity whose concave side faces into said cavity and having a reflective coating on its plane side for reflecting said stimulated radiation back through said cavity.

2. The invention according to claim 1 wherein said plano-concave substrate has an anti-reflective coating on its concave side for minimizing the loss of radiation passing therethrough prior to impinging upon said reflective coating.

3. The invention according to claim 2 wherein the radius of curvature of said plano-concave substrate is equal to the product of the radius of curvature of a given front surface convex mirror times the difference between unity and the index of refraction of said plano-concave substrate, said index of refraction having a value greater than unity.

4. The invention according to claim 1 wherein said plano-concave substrate comprises an absorption material for suppressing unwanted radiation transitions of said active medium.

5. The invention according to claim 1 wherein said plano-concave substrate has a spike transmission coating on its concave side for preventing unwanted radiation from reaching said reflective coating on said plane side of said substrate whereby unwanted radiation transitions of said active medium are suppressed.

* * * * *